(12) United States Patent
Choi et al.

(10) Patent No.: US 9,869,253 B2
(45) Date of Patent: Jan. 16, 2018

(54) MULTIPLE VARIABLE VALVE LIFT APPARATUS

(71) Applicant: Hyundai Motor Company, Seoul (KR)

(72) Inventors: Byong Young Choi, Bucheon-si (KR); Seung Kook Han, Seoul (KR); Soo Hyung Woo, Yongin-si (KR); Wootae Kim, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 51 days.

(21) Appl. No.: 15/157,257

(22) Filed: May 17, 2016

(65) Prior Publication Data
US 2017/0152772 A1 Jun. 1, 2017

(30) Foreign Application Priority Data

Nov. 27, 2015 (KR) .................. 10-2015-0167958

(51) Int. Cl.
| | | |
|---|---|---|
| *F01L 1/04* | (2006.01) | |
| *F02D 13/02* | (2006.01) | |
| *F01L 1/053* | (2006.01) | |
| *F01L 1/047* | (2006.01) | |
| *F01L 1/344* | (2006.01) | |

(Continued)

(52) U.S. Cl.
CPC .......... *F02D 13/0207* (2013.01); *F01L 1/053* (2013.01); *F01L 13/0036* (2013.01); *F01L 1/08* (2013.01); *F01L 1/185* (2013.01); *F01L 1/267* (2013.01); *F01L 1/34413* (2013.01); *F01L 13/0005* (2013.01); *F01L 13/0042* (2013.01); *F01L 2001/0473* (2013.01);

(Continued)

(58) Field of Classification Search
CPC .......... F01L 2001/0473; F01L 1/34413; F01L 13/0042; F01L 2013/0052
USPC ........................................ 123/90.18
See application file for complete search history.

(56) References Cited

U.S. PATENT DOCUMENTS

2011/0226205 A1* 9/2011 Kraus ............ F01L 1/047
123/90.18
2014/0102389 A1* 4/2014 Stolk ............. F01L 13/0036
123/90.15

(Continued)

FOREIGN PATENT DOCUMENTS

JP 2010-520394 A 6/2010
JP 2010-520395 A 6/2010

(Continued)

*Primary Examiner* — Jorge Leon, Jr.
(74) *Attorney, Agent, or Firm* — Morgan, Lewis & Bockius LLP

(57) ABSTRACT

A multiple variable valve lift apparatus may include a first moving cam provided to rotate together with a camshaft and move in an axial direction of the camshaft, and configured to form a first cam guide protrusion and a plurality of cams realizing different valve lifts from each other, a second moving cam provided to rotate together with a second camshaft and move in an axial direction of the second camshaft, and configured to form a second cam guide protrusion and a plurality of cams realizing different valve lifts from each other, a first operating device operated to move the first moving cam in a first direction, a second operating device operated to move the second moving cam in a second direction, a controller configured to control operations of the first operating device and the second operating device, and a valve opening/closing device.

6 Claims, 5 Drawing Sheets

(51) Int. Cl.
    *F01L 13/00*    (2006.01)
    *F01L 1/08*    (2006.01)
    *F01L 1/18*    (2006.01)
    *F01L 1/26*    (2006.01)

(52) U.S. Cl.
    CPC . *F01L 2013/0052* (2013.01); *F01L 2013/101* (2013.01); *F01L 2105/00* (2013.01)

(56) References Cited

U.S. PATENT DOCUMENTS

| | | | | |
|---|---|---|---|---|
| 2014/0182531 | A1* | 7/2014 | Choi | F01L 1/34 123/90.15 |
| 2014/0303873 | A1* | 10/2014 | Glugla | F01L 13/0036 701/103 |
| 2015/0047589 | A1* | 2/2015 | Moran | F01L 13/0036 123/90.18 |
| 2015/0107540 | A1* | 4/2015 | Moon | F01L 13/0036 123/90.15 |
| 2015/0233271 | A1* | 8/2015 | Popp | F01L 13/0036 123/90.18 |

FOREIGN PATENT DOCUMENTS

| | | |
|---|---|---|
| KR | 2014-0087368 A | 7/2014 |
| WO | WO 2012/146361 A1 | 11/2012 |

* cited by examiner

MULTIPLE VARIABLE VALVE LIFT APPARATUS

CROSS-REFERENCE TO RELATED APPLICATION

The present application claims priority to Korean Patent Application No. 10-2015-0167958, filed Nov. 27, 2015, the entire contents of which is incorporated herein for all purposes by this reference.

BACKGROUND OF THE INVENTION

Field of the Invention

The present invention relates to a multiple variable valve lift apparatus. More particularly, the present invention relates to a multiple variable valve lift apparatus which realizes multiple valve lift by a simple structure.

Description of Related Art

Generally, an internal combustion engine receives fuel and air into a combustion chamber and generates power by combusting the fuel and the air. An intake valve is operated by drive of a camshaft, and air flows into the combustion chamber while the intake valve is open. In addition, an exhaust valve is operated by driving of a camshaft, and air is exhausted from the combustion chamber while the exhaust valve is open.

Optimal operation of the intake valve/exhaust valve, however, depends on the RPM of the engine. That is, an appropriate time for lifting or opening/closing the valves depends on the RPM of the engine. In order to implement an appropriate valve operation in accordance with the RPM of the engine, as described above, a VVL (Variable Valve Lift) apparatus that operates valves at different lifts in accordance with the RPM of an engine has been studied.

Meanwhile, in a variable valve lift apparatus having a cam shift type which is configured that a plurality of cams are designed for driving a valve and the plurality of cams is moved along an axial direction, it is important that relative position between the plurality of cams and a valve opening/closing device is exactly controlled.

In case that relative position between the plurality of cams and a valve opening/closing device is not exactly controlled, interference is occurred between elements for guiding axial direction motion of the plurality of cams and the valve opening/closing device or between the plurality of cants and the valve opening/closing device. Thus, the valve opening/closing device or the variable valve lift apparatus may be damaged, or reliability of a cam shift may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multiple variable valve lift apparatus having advantages of preventing interference between constituent elements and improving reliability of a cam shift.

According to various aspects of the present invention, a multiple variable valve lift apparatus may include a first moving cam formed in a hollow cylindrical shape in which a camshaft inserted into the hollow cylindrical shape, provided to rotate together with the camshaft and move in an axial direction of the camshaft, and configured to form a first cam guide protrusion and a plurality of cams realizing different valve lifts from each other, a second moving cam formed in a second hollow cylindrical shape in which a second camshaft inserted into the second hollow cylindrical shape, provided to rotate together with the second camshaft and move in an axial direction of the second camshaft, and configured to form a second cam guide protrusion and a plurality of cams realizing different valve lifts from each other, a first operating device configured with a plurality of pins for guiding the first cam guide protrusion disposed thereon and operated to move the first moving cam in a first direction, a second operating device configured with a plurality of pins for guiding the second cam guide protrusion disposed thereon and operated to move the second moving cam in a second direction, a controller configured to control operations of the first operating device and the second operating device, and a valve opening/closing device contacting with any one cam of the plurality of cams so as to open/close a valve, in which at least one of gaps between the plurality of pins respectively disposed at the first operating device and the second operating device is different from another gap.

The first cam guide protrusion and the second cam guide protrusion may be formed in opposite directions in order to move the first moving cam and the second moving cam in the first direction and the second direction, respectively.

The first moving cam and the second moving cam may move together.

Each of the first and second operating devices may include first and second solenoids actuated under control of the controller, and each of the first and second cam guide protrusions may be inserted between at least a first and a second of the plurality of pins so as to be guided when the plurality of pins are jutted by the first and second solenoid.

The plurality of pins may include a main pin configured to be jutted depending on operations of the first and second solenoid and at least two subordinate pins engaged to the main pin to be jutted together with the main pin, and a gap between the main pin and at least one of the subordinate pins may be different from a gap between the main pin and another one of the subordinate pins.

The plurality of pins may be formed in a cylindrical shape having equal diameter.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
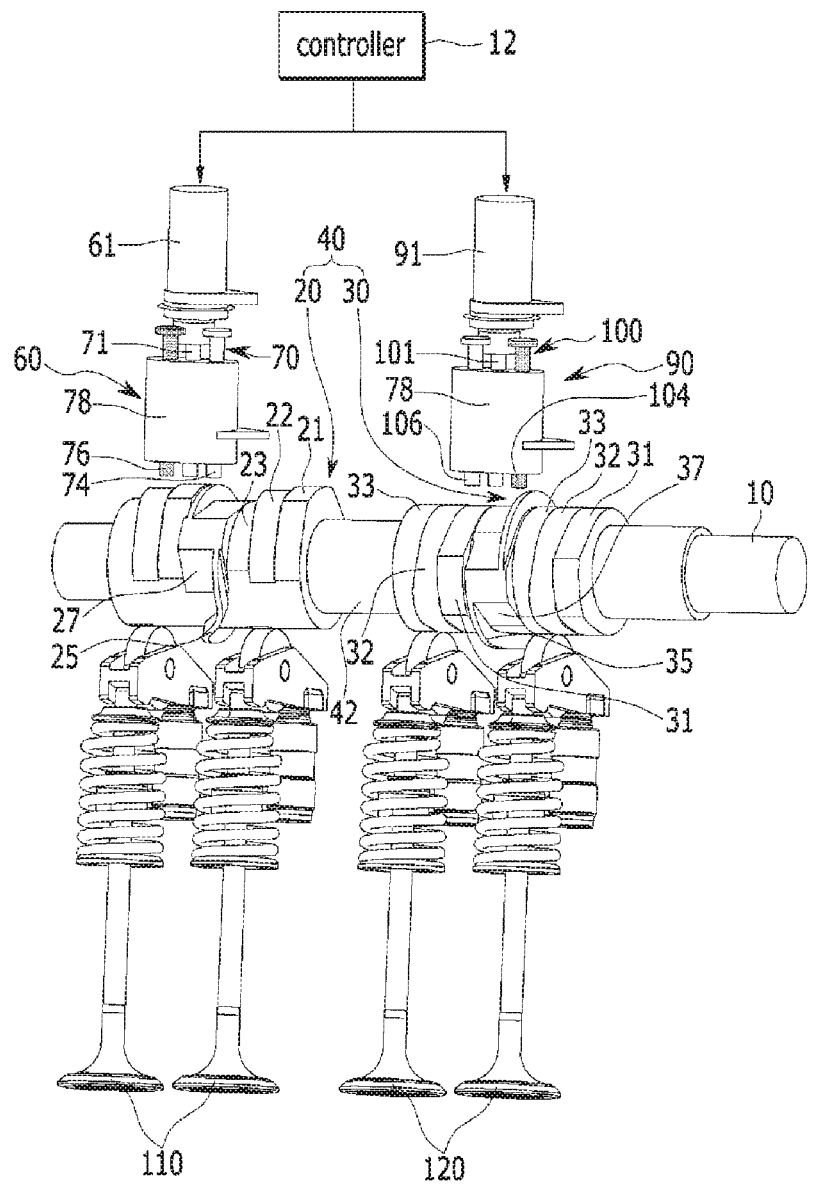
FIG. 1 is a perspective view of an exemplary multiple variable valve lift apparatus according to the present invention.

FIG. 1 is a perspective view of a multiple variable valve lift apparatus according to various embodiments of the present invention.

As shown in FIG. 1, a multiple variable valve lift apparatus according to various embodiments of the present invention includes a camshaft 10, a first moving cam 20 including a plurality of cams 21, 22, and 23 having different shapes, having a first cam guide protrusion 25, rotating together with the camshaft 10, and slidable in an axial direction of the camshaft 10, a second moving cam 30 including a plurality of cams 31, 32, and 33 having different shapes, having a second cam guide protrusion 35, rotating together with the camshaft 10, and slidable in the axial direction of the camshaft 10, a first operating device 60 selectively jutting out to guide the first cam guide protrusion 25 to move the first moving cam 20 in a first direction, a second operating device 90 selectively jutting out to guide the second cam guide protrusion 35 to move the second moving cam 30 in a second direction, a controller 12 configured to control operations of the first operating device 60 and the second operating device 90, and valve opening and closing devices 110 and 120 brought into contact with any one of the plurality of cams 21, 22, 23, 31, 32, and 33 so as to be opened and closed.

It is illustrated that the first moving cam 20 and the second moving cam 30 include three cams 21, 22, and 23, and 31, 32, and 33, respectively, but the present invention is not limited thereto, and the first moving cam 20 and the second moving cam 30 may have various numbers of cams.

The plurality of cams 21, 22, 23, 31, 32, and 33 may be disposed in order, sequentially starting from the cam having the largest valve lift, and any one of the cams, for example, the cams 23 and 33 may be cylinder deactivation cams having a cam lift of zero (0).

The first cam guide protrusion 25 and the second cam guide protrusion 35 are formed in the opposite directions in order to move the first moving cam 20 and the second moving cam 30 in the first direction and the second direction, respectively. For example, the first cam guide protrusion 25 may move the first moving cam 20 to the left in the drawing, and the second cam guide 35 may move the second moving cam 30 to the right.

The first and second operating devices 60 and 90 include first and second solenoids 61 and 91 actuated under the control of the controller 12, and first and second guide parts 70 and 100 jutting out by the first and second solenoids 61 and 91 and allowing the first and second cam guide protrusions 25 and 35 to be inserted therein, respectively, in order to move the first and second moving cams 20 and 30.

The first and second operating devices 60 and 90 each further include a pin housing 78, respectively, the first and second guide parts 70 and 100 further include main pins 71 and 101 rotatably provided in the pin housing 78 and jutting out according to actuations of the first and second solenoids 61 and 91, and subordinate pins 74, 76, 104, and 106 rotatably provided in the pin housing 78 and engaged with the main pins 71 and 101 so as to jut out together with the main pins 71 and 101.

In FIG. 1, one main pin 71, 101 and two subordinate pins 74, 76 and 104, 106 are provided to one pin housing 78, but the number of the main pin 71, 101 and the subordinate pin 74, 76 and 104, 106 are not limited thereto, and the main pin 71, 101 and the subordinate pin 74, 76 and 104, 106 may be provided in proportion to the number of the plurality of cams 21, 22, 23, 31, 32, and 33.

Sloped portions 27 and 37 may be formed in the first and second moving cams 20 and 30, respectively, to allow the first and second guide parts 70 and 100 to return to their original positions after the first and second moving cams 20 and 30 are moved.

The first moving cam 20 and the second moving cam 30 may be connected to integrally move, and the first moving cam 20 and the second moving cam 30 may be integrally formed as a single moving cam 40. That is, the first cam guide protrusion 25 and the second cam guide protrusion 35 may move the moving cam 40 in the first direction or the second direction. In addition, a journal portion 42 is formed in a cylinder shape having an uniform radius so as to connect the first moving cam 20 with the second moving cam 30.

When the main pins 71 and 101 and the subordinate pins 74, 76, 104, and 106 jut out so the first and second cam guide protrusions 25 and 35 are inserted between the main pins 71 and 101 and the subordinate pins 74, 76, 104, and 106, the first moving cam 20 and the second moving can 30, or the moving can 40, move in an axial direction of the camshaft 10, and the main pins 71 and 101 and the subordinate pins 74, 76, 104, and 106 may move along the sloped portions 27 and 37 so as to return to their original positions.

Figure 2:
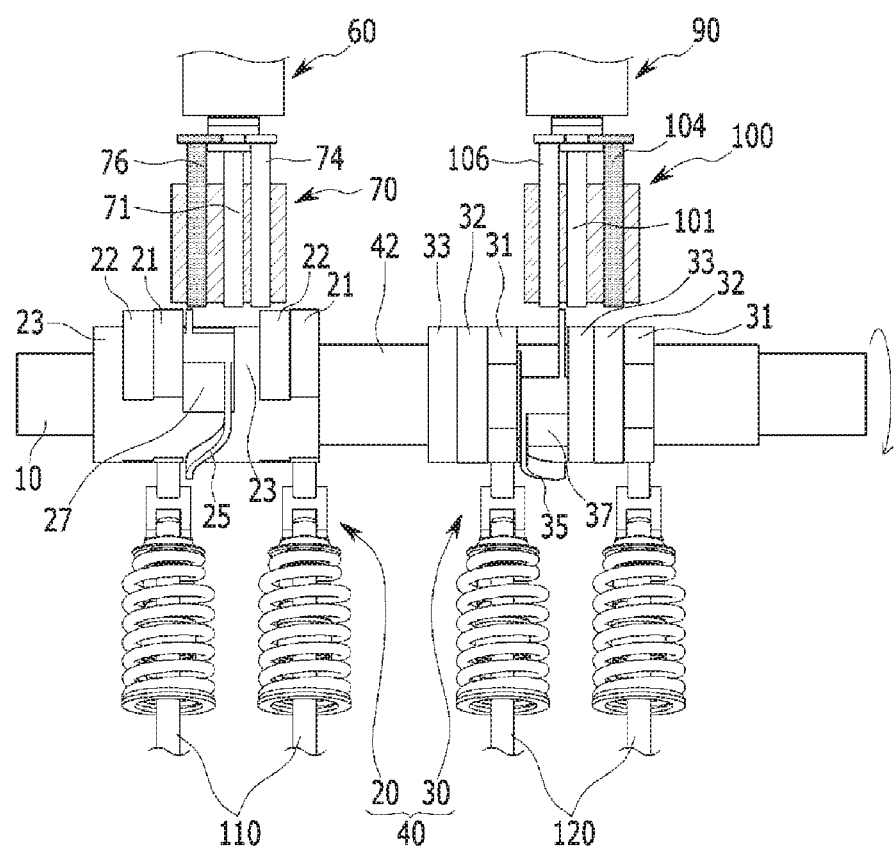
FIG. 2, FIG. 3, and FIG. 4 are operational views of the exemplary multiple variable valve lift apparatus according to the present invention.
Figure 3:
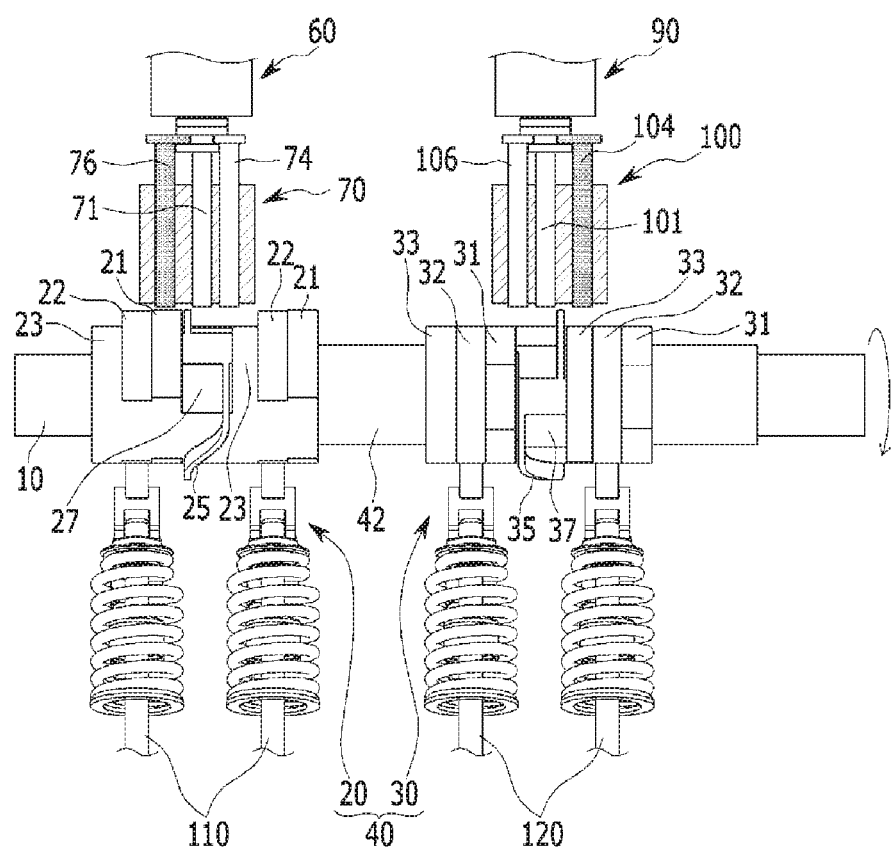
Figure 4:
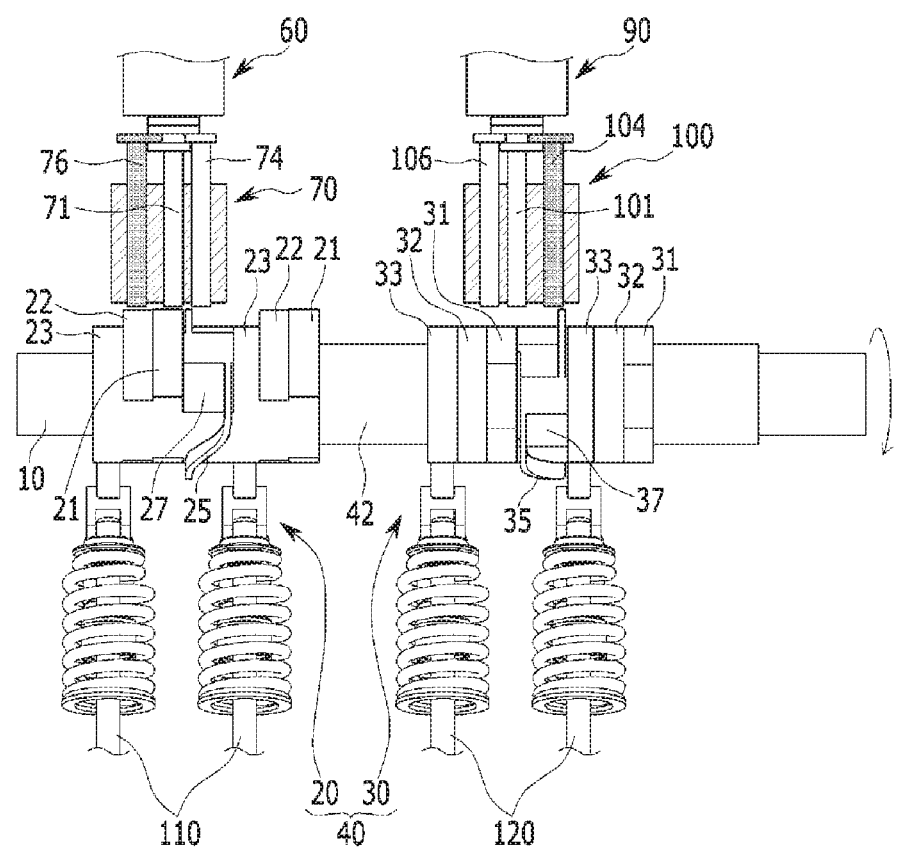

FIG. 2 to FIG. 4 are operational views of a multiple variable valve lift apparatus according to various embodiments of the present invention.

As shown in FIG. 2, in a state in which the valve opening and closing devices 110 and 120 are in contact with the right cams 21 and 31 among the cams, when a load of an engine is reduced, the controller 12 operates the second operating device 90 and the second guide part 100 juts out. Then, the second cam guide protrusion 35 is guided on the state of being inserted between the main pin 101 and the left subordinate pin 106 of the second guide part 100. Then, as illustrated in FIG. 3, the second moving cam 30 and the first moving cam 20 move toward the second direction which is the right in the drawing, and the valve opening and closing devices 110 and 120 come into contact with the middle cams 22 and 32 among the cams so as to be opened and closed. Through this process, the valve lift is varied. The second guide part 100 returns to its original position by the sloped portion 37 formed in the second moving cam 30.

In the state illustrated in FIG. 3, when the load of the engine is further reduced, the controller 12 operates the second operating device 90 and the second guide part 100 juts out. Then, the second cam guide protrusion 35 is guided on the state of being inserted between the main pin 101 and the right subordinate pin 104 of the second guide part 100. Subsequently, as illustrated in FIG. 4, the second moving cam 30 and the first moving cam 20 once more move toward the second direction which is the right in the drawing, and the valve opening and closing devices 110 and 120 come into contact with the left cams 23 and 33 among the cams so as to be opened and closed. Through this process, the valve lift is varied. The second guide part 100 returns to its original position by the sloped portion 37 formed in the second moving cam 30.

In the state illustrated in FIG. 4, when the load of the engine is increased, the controller 12 operates the first operating device 60 and the first guide part 100 juts out. A change of the valve lift by a movement toward the first direction of the moving cam 40 depending on the jutting of the first guide part 100 is similar to the above described change of the valve lift by the movement toward the second direction of the moving cam 40 through the moving cam 40 is operated in a reverse moving direction, so a detailed description thereof will be omitted.

In general, a space between cams is limited, but in the multiple variable valve lift apparatus according to various embodiments of the present invention, the first cam guide protrusion 25 and the second cam guide protrusion 35 have a plate shape, thus overcoming restrictions with respect to the axial directional space of the camshaft 10.

Figure 5:
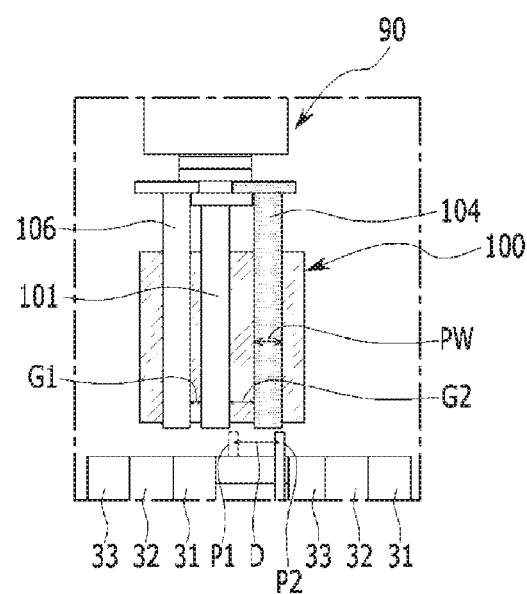
FIG. 5 is an enlarged view of an operating device according to the present invention.

FIG. 5 is an enlarged view of an operating device according to various embodiments of the present invention.

As shown in FIG. 5, the two subordinate pins 74, 76 and 104, 106 and the main pin 71, 101, which are disposed at the operating device 60, 90, may be formed to have an equal width from each other along an axial direction of the camshaft 10, but the present invention is not limited thereto. In addition, a gap G2 between one 76, 104 of the two subordinate pins 74, 76 and 104, 106 disposed at the operating device 60, 90 and the main pin 71, 101 is formed to be longer than a gap G1 between the other subordinate pin 74, 106 and the main pin 71,101. Herein, the one subordinate pin 76, 104 having the long gap G2 with the main pin 71,101 will be called "interference preventing pin 76, 104".

The interference preventing pin 76, 104 may be a left subordinate pin 76 of the first operating device 60 being operated so as to move the moving cam 40 in the first direction (left in drawing) and a right subordinate pin 104 of the second operating device 90 being operated so as to move the moving cam 40 in the second direction (right in drawing).

In case that the first solenoid 61 and the first operating device 60 malfunction so that the first guide part 70 is jutted on the state that the a valve opening/closing device 110, 120 is contacted to a right cam 21, 31 of the cams, the interference preventing pin 76 of the first operating device 60 is blocked to the first cam guide protrusion 25 such that the first guide part 70 is jutted no more. Therefore, it is prevented that the moving cam 40 is moved more toward the left by the first guide part 70 jutting on the state that the valve opening/closing device 110, 120 is contacted to the right cam 21, 31 of the cams. As this, interferences between constituent elements such as an interference between the first cam guide protrusion 25 and the valve opening/closing device 110 is prevented as an excessive movement of the moving cam 40 is limited.

In case that the second solenoid 91 and the second operating device 90 malfunction so that the second guide part 100 is jutted on the state that the a valve opening/closing device 110, 120 is contacted to a left cam 23, 33 of the cams, the interference preventing pin 104 of the second operating device 90 is blocked to the second cam guide protrusion 35 such that the second guide part 100 is jutted no more. Therefore, it is prevented that the moving cam 40 is moved more toward the right by the second guide part 100 jutting on the state that the valve opening/closing device 110, 120 is contacted to the left cam 23, 33 of the cams As this, interferences between constituent elements such as an interference between the second cam guide protrusion 35 and the valve opening/closing device 120 is prevented as an excessive movement of the moving cam 40 is limited.

In addition, a distance D of which the cam guide protrusion 25, 35 is moved while the valve lift is changed as one step is shorter than a length adding the width PW of the interference preventing pin 76, 104 to the gap G2 between the main pin 71, 101 and the interference preventing pin 76, 104. In FIG. 5, the position of the cam guide protrusion 25, 35 before moving is shown by P1, and the position thereof after moving is shown by P2.

That is, for function of the interference preventing pin 76, 104, the gap G2 between the main pin 71, 101 and the interference preventing pin 76, 104 is designed to be longer than a length subtracting the width PW of the interference preventing pin 76, 104 from the moving distance D of the cam guide protrusion 25, 35 during changing the valve lift as one step.

According to various embodiments of the present invention, multiple valve lifts can be realized by a simple composition. In addition, interferences between constituent elements may be prevented and reliability of the cam shift may be improved as the excessive movement of the moving cam 20, 30 is limited even while the solenoid 61, 91 and the operating device 60, 90 malfunction.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multiple variable valve lift apparatus comprising:
a first moving cam formed in a hollow cylindrical shape in which a camshaft inserted into the hollow cylindrical shape, provided to rotate together with the camshaft and move in an axial direction of the camshaft, and configured to form a first cam guide protrusion and a plurality of cams realizing different valve lifts from each other;
a second moving cam formed in a second hollow cylindrical shape in which a second camshaft inserted into the second hollow cylindrical shape, provided to rotate together with the second camshaft and move in an axial direction of the second camshaft, and configured to form a second cam guide protrusion and a plurality of cams realizing different valve lifts from each other;

a first operating device configured with a plurality of pins for guiding the first cam guide protrusion disposed thereon and operated to move the first moving cam in a first direction;

a second operating device configured with a plurality of pins for guiding the second cam guide protrusion disposed thereon and operated to move the second moving cam in a second direction;

a controller configured to control operations of the first operating device and the second operating device; and a valve opening/closing device contacting with any one cam of the plurality of cams so as to open/close a valve, wherein at least one of gaps between the plurality of pins respectively disposed at the first operating device and the second operating device is different from another gap.

2. The apparatus of claim 1, wherein the first cam guide protrusion and the second cam guide protrusion are formed in opposite directions in order to move the first moving cam and the second moving cam in the first direction and the second direction, respectively.

3. The apparatus of claim 1, wherein the first moving cam and the second moving cam move together.

4. The apparatus of claim 1, wherein each of the first and second operating devices comprises first and second solenoids actuated under control of the controller, and each of the first and second cam guide protrusions is inserted between at least a first and a second of the plurality of pins so as to be guided when the plurality of pins are jutted by the first and second solenoid.

5. The apparatus of claim 4, wherein the plurality of pins comprises a main pin configured to be jutted depending on operations of the first and second solenoid and at least two subordinate pins engaged to the main pin to be jutted together with the main pin, and a gap between the main pin and at least one of the subordinate pins is different from a gap between the main pin and another one of the subordinate pins.

6. The apparatus of claim 5, wherein the plurality of pins are formed in a cylindrical shape having equal diameter.

* * * * *